United States Patent [19]
Miller et al.

[11] Patent Number: 5,870,428
[45] Date of Patent: Feb. 9, 1999

[54] METHOD FOR PROVIDING REMOTE LOOP BACK TESTING IN A DIGITAL DATA SYSTEM HAVING MULTIPLE PROTOCOLS

[75] Inventors: David E. Miller, Meridianville; Robert A. Barrett; David E. Wilder, both of Huntsville, all of Ala.

[73] Assignee: Motorola Inc., schaumburg, Ill.

[21] Appl. No.: 566,755

[22] Filed: Dec. 4, 1995

[51] Int. Cl.$^6$ ............................. H04B 1/38; H04L 5/16
[52] U.S. Cl. ............................................ 375/221; 370/249
[58] Field of Search .................................... 375/219, 221, 375/222, 354; 370/249; 455/68–70

[56] References Cited

U.S. PATENT DOCUMENTS

| | | | |
|---|---|---|---|
| 4,686,668 | 8/1987 | Koseki et al. | 370/249 |
| 5,115,451 | 5/1992 | Furlong | 375/221 |
| 5,347,522 | 9/1994 | Ohmori | 371/20.5 |

*Primary Examiner*—Chi H. Pham
*Assistant Examiner*—Bryan Webster
*Attorney, Agent, or Firm*—John Powell

[57] ABSTRACT

An adaptive digital data unit (600) initiates and successfully completes a remote loop back test. The adaptive digital data unit (600) has a controller (610), a local transmitter (620), a local receiver (640) a timer (622) and a detector (634). When a remote adaptive digital data unit (600) transmits a first data sequence and a second data sequence, the local adaptive digital data unit (600) receives the second data sequence from the remote digital data unit and determines if the second data sequence matches one of two predetermined data sequences. If so, a test successful flag is generated.

9 Claims, 4 Drawing Sheets

METHOD FOR PROVIDING REMOTE LOOP BACK TESTING IN A DIGITAL DATA SYSTEM HAVING MULTIPLE PROTOCOLS

FIELD OF THE INVENTION

This invention relates in general to digital data systems and more particularly to remote loop back tests for digital data units.

BACKGROUND OF THE INVENTION

In a typical digital data system arranged for point-to-point data transfer over a digital network there is a local data terminal equipment (DTE) and a local digital data unit (DDU) connected to a remote DDU and a remote DTE via a digital network. DTE are devices such as terminals and personal computers serve as an interface between a user and the DDU. The DDUs combine the functions of a data service unit (DSU) and a channel service unit (CSU) into a single unit which makes it possible to transfer data between a local and remote site over the digital network. The digital network is supplied by a service provider and may operate at various data rates, such as 64 kilobits per second and greater. DDUs that are available for transferring data over the digital network include a Motorola DDS/MR64 and similar devices.

In order to maintain and establish data connections, testing methods or modes have become an integral part of DDUs. Most of the various test modes are initiated and terminated via a control lead (or connection) from the DTE to the DDU or from a front panel switch located on the DDU. One of these test, the remote loop back test, serves as a tool to assist maintenance personnel at a local site to isolate and detect trouble conditions in a digital data system. The remote loop back test may verify operation of the local DTE, the local DDU, the digital network, and the remote DDU.

When a command to perform the remote loop back test is initiated by the local DTE, the local DDU will send a test signal to the remote DDU, causing it to enter the remote loop back test mode. When the remote DDU is in the loop back test mode, data from the local DTE or other test data transmitted by a local transmitter in the local DDU will be received by the remote DDU and looped back through a remote receiver and remote transmitter (within the remote DDU) and returned to a local receiver in the local DDU. If the transmitted test data and the data returned to the local receiver are the same (except for a time delay), then the local DDU, the digital network, the remote DDU and corresponding connectors are functioning properly and the remote loop back test is successful.

Presently there are two recognized methods of initiating and terminating the remote loop back test. Each method initiates the test by transmitting a test (or protocol) signal, from the local DDU, to the remote DDU. The test signals (or sequences) for both methods use a pseudo random pattern (or sequence) generated by a scrambler using a scrambler polynomial equal to 1+X−4+X−7. The scrambler, using the scrambler polynomial, may be implemented using a seven stage shift register with feedback taken from the forth and seventh stages. When the input sequence to the scrambler is a binary zero sequence (a continuous string of zeros) the pseudo random pattern produced is a repeating pattern, 127 bits in length, generally known as the PN127 sequence. When the input to the scrambler is a binary one sequence (a continuous string of ones), a scrambled binary ones sequence is generated which is sometimes known as the inverse PN127 sequence. The scrambled binary ones sequence may also be generated by inverting the PN127 sequence. Scramblers are well known to those in the art and are discussed in textbooks such as Digital Transmission Systems by David R. Smith (1985) and are used in a variety of data communications products designed according to certain standards, such as Recommendations V.34 and V.54 of the International Telecommunications Union (ITU).

The first of the recognized methods, a prior art approach, to perform the remote loop back test uses the procedures described in the ITU (previously known as the Consultative Committee on International Telephony and Telegraphy or CCITT) Recommendation V.54. Recommendation V.54 requires the local DDU to continuously transmit (via the local transmitter) the PN127 sequence until at least 2048 bits are transmitted. The at least 2048 bit sequence transmitted in accordance with V.54 is called a preparatory pattern (or sequence). The local DDU having sent the preparatory pattern will then search, using a local receiver, for an acknowledge pattern from the remote DDU. When the local receiver detects the acknowledge pattern the remote loop back test is successful. Recommendation V.54 defines the acknowledge pattern to be at least 1948 bits of the scrambled binary ones sequence. In order to comply with V.54, the remote DDU, upon recognition of the preparatory pattern, must transmit the acknowledge pattern and then enter the remote loop back test mode. The signal for termination of the remote loop back test is initiated by the local DDU and requires the local transmitter to transmit a termination pattern, comprising 8192 bits of scrambled binary ones followed by 64 binary ones, to the remote DDU.

The second prior art method to perform a remote-loop back test uses a technique (or protocol) jointly developed by American Telephone and Telegraph (AT&T) and U.S. Sprint (sometimes called the Sprint method). In the second method, the local DDU transmits the PN127 sequence for a period of two seconds, then sends binary ones for an additional 2 seconds. The remote unit, upon recognition of the PN127 sequence for a period of 256 error free milliseconds, enters the remote loop back test mode. When the local receiver detects reflected data (data returned from the remote DDU) then the remote loop back test is successful. The termination of the remote loop back test is initiated by the local DDU when the local transmitter transmits the scrambled binary ones sequence for 2 seconds followed by binary ones for an additional 2 seconds.

A local DDU designed according to the first method, i.e., Recommendation V.54, will not be compatible with a remote DDU designed according to the Sprint method when attempting to initiate and complete the remote loop back test. Because each of these recognized methods have advantages and disadvantages both are widely used in digital data systems. Hence some DDUs are designed to operate according to the V.54 protocol, while others are designed to operate according to the Sprint protocol. The differences in the two methods may cause incompatibility problems when DDUs are coupled via the digital network and are required to perform the remote loop back test.

Accordingly, a need has remained to reliably initiate and perform a remote loop back test from a local digital data unit when the test method (or protocol) of a remote digital data unit is unknown. In addition, a need has remained to implement such a test efficiently, with minimal complexity and with a minimal response time, and with equipment having a lower or reduced cost to manufacture or purchase.

DETAILED DESCRIPTION OF THE INVENTION

Figure 1:
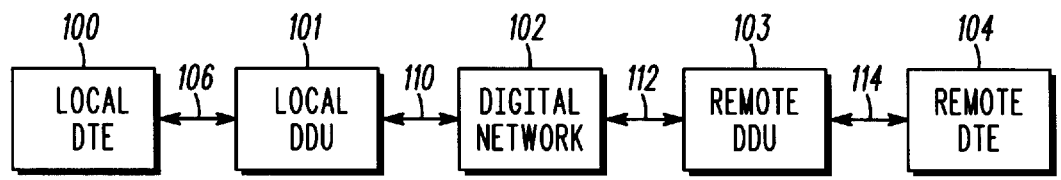
FIG. 1 is a block diagram illustrating a digital data system.

FIG. 1 Illustrates a digital data system 98 capable of transferring data between a local site and a remote site. A local DTE 100, such as a terminal or a computer, is coupled to, via local terminal cable 106, such as a RS232 type connector or similar, a local digital data unit (DDU) 101. The local DDU 101 has a controller, a local transmitter and local receiver and is connected to a digital network 102 by local cable 110 having a local transmit connector and a local receive connector. A remote DTE 104 and remote DDU 103 are coupled via remote terminal cable 114 with the remote DDU further being coupled to the digital network via remote cable 112. The arrangement illustrated in FIG. 1 serves as a means for data transfer between the local DTE 100 and the remote DTE 104 via the digital network. The digital network 102, which may transfer data in both directions, is leased or purchased from a service provider. Both the local terminal cable 106 and the remote terminal cable 114 have multiple connectors for simultaneously transferring data and command information in both directions. However the local cable 110 and remote cable 112 normally have only one transmit data connector (a twisted wire pair) and one receive connector. When data is transmitted from the local DDU 101 over the digital network 102, a predetermined sequence of data may serve as command information. Command information from the local DDU 101 may cause the remote DDU 103 to operate in various modes, such as the loop back test mode.

Figure 2:
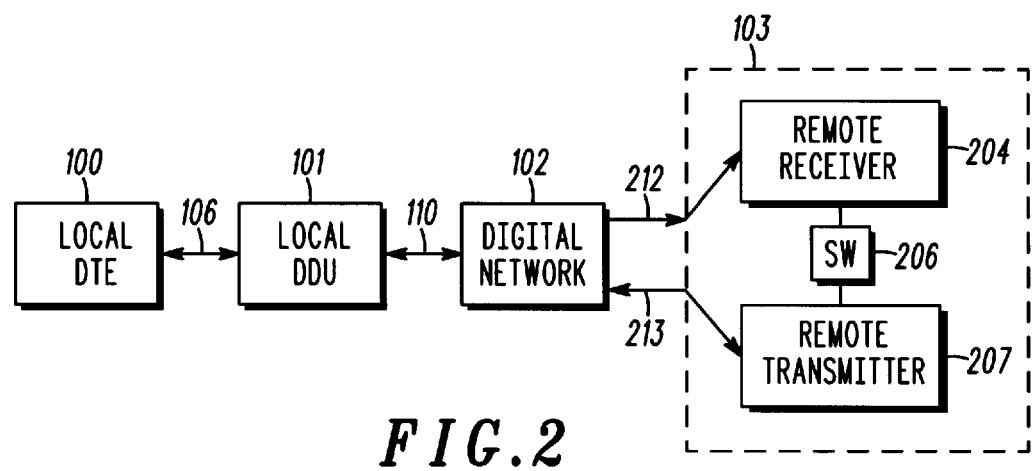
FIG. 2 is a block diagram illustrating a remote loop back test.

FIG. 2 illustrates a remote loop back test arrangement, i.e., a data path going from the local DDU 101 and returning back to the local DDU. The data path or loop back path is formed when the remote DDU 103 is in the remote loop back mode. When a data communication system is arranged for the remote loop back test, the remote DDU 104 serves (or functions) as a remote switch. The remote switch comprises a remote receiver 204 coupled via a switch 206 to a remote transmitter 207 within the remote DDU 103. The remote switch is closed in response to a remote loop back test command signal from the local DDU 101. When the remote switch is closed, data received by the remote DDU 103 is turned around and sent back to the local DDU 101. The elements of the loop back path include the local transmitter, the local transmit connector, a transmit path in the digital data network 102, the remote receive connector, the remote switch (in the closed position), the remote transmit connector, a receive path in the digital network, the local receive connector, and the local receiver. The local DTE 100 may transmit and receive data when the data communications system is arranged (or configured) for the remote the loop back test. However the remote DTE 104 does not transmit or receive data during the remote loop back test. Because the remote transmitter may have signal conditioning (amplifying and shaping) circuits, the remote switch may condition data. In summary, when the data communications system is configured for remote loop back test, data is sent from and received by the local DDU 101. If all elements in the loop back path are operating correctly, then the data received by the local DTE 100 is a delayed replica of the data sent from the local DDU 101. The elements that comprise both the local and remote digital data units (101 and 103) are known in the prior art and may comprise a variety of discrete components, microprocessors (such as an 80C31), analog multiplexers, operational amplifiers, resistors, capacitors, gate arrays, custom integrated circuits or may be embodied in whole or part as an integrated circuit.

Figure 3:
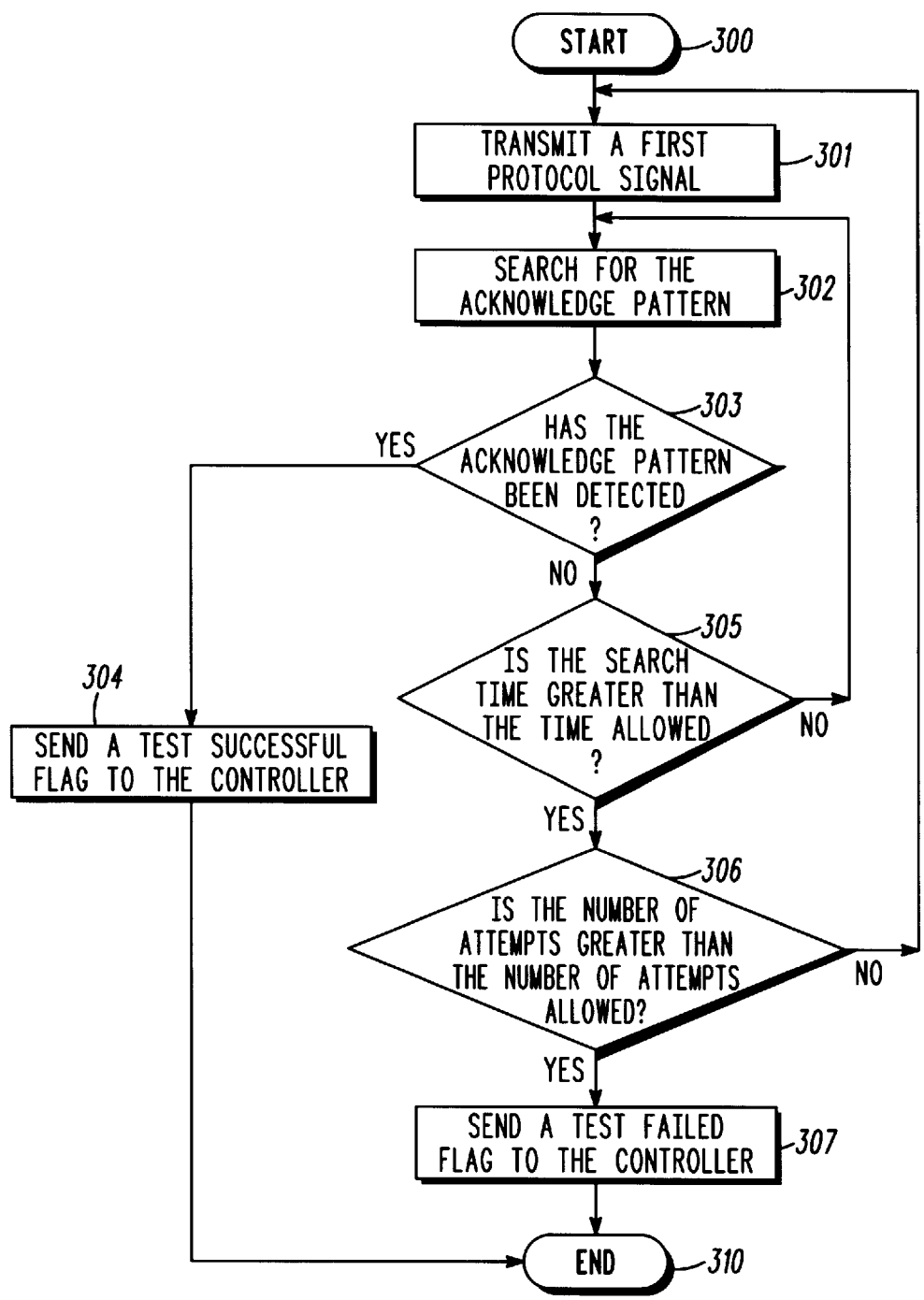
FIG. 3 is a flow diagram illustrating a first prior art method for a remote loop back test.

FIG. 3 is a flow diagram illustrating a first prior art method of a remote loop back test using the procedures as described in Recommendation V.54. Referring to FIG. 3, the process is initiated, step 300, and then the local DDU 101 transmits a first protocol signal, which may comprise at least 2048 bits of the PN127 sequence, to the remote DDU 103, step 301. During the transmission of the first protocol signal, the local receiver searches for the acknowledge pattern, which may be a minimum of 1948 bits of scrambled ones, step 302. The remote unit 103 generates the acknowledge pattern in response to the first protocol signal and sends it to the local DDU 101 over the digital network. If the acknowledge pattern is detected (a pattern match occurs), the local receiver sends a test successful flag to the controller, step 304. The test successful flag may then be used to notify the local DTE 100 that the remote loop back test is successful, thereby providing a positive handshake. If the acknowledge pattern is not detected after a predetermined amount of time, step 305, then steps 301 through 305 may be repeated for an allowed number of times, step 306. If the allowed number of times is exceeded without detecting the acknowledge pattern, then a test failed flag is sent to the controller, step 307. For a product designed according to the flow diagram of FIG. 2, when the time allowed is two seconds and the allowed number of times is two, then the Recommendation V.54 method may successfully complete the remote loop back test. The method described in FIG. 3 is known by those in the art and may be implement using a combination of functional elements.

Figure 4:
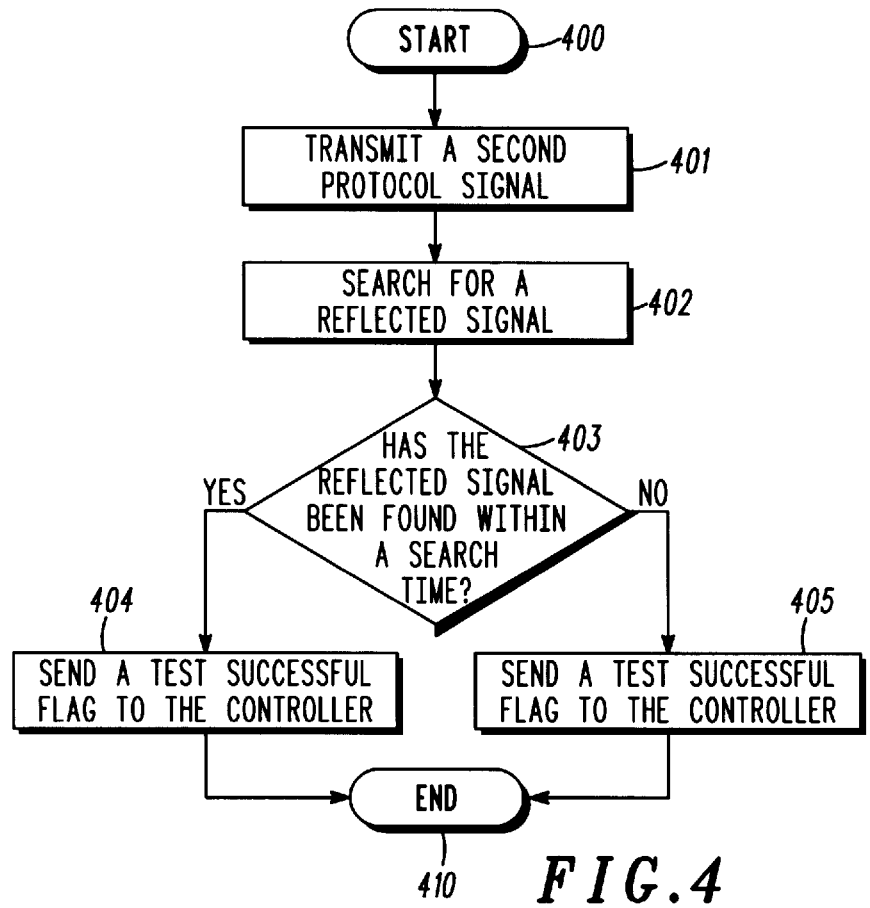
FIG. 4 is a flow diagram illustrating a second prior art method for a remote loop back test.

FIG. 4 is a flow diagram illustrating a second prior art method (the Sprint method) for a remote loop back test. Referring to FIG. 4, the process begins when the local DTE 101 commands the local DDU 101 to start the remote loop back test, step 400, and in response the local unit transmits a second protocol signal, which may be two seconds of the PN127 pattern followed by two seconds of binary ones, step 401. Once the second protocol signal has been sent to the remote unit, the local unit assumes the remote unit has entered the remote loop back test mode (since this is the Sprint method). The remote unit, upon recognition of the second protocol signal, places itself into the remote loop back test mode and loops the data received back, unchanged, to the initiating unit. The local DDU 101 searches for a reflected signal, a delayed replica of the second protocol signal, for a predetermined period of time. If a reflected signal is found, then a test successful flag is sent to the controller. However if a reflected signal is not found, then a test failed flag is sent to the controller.

Figure 5:
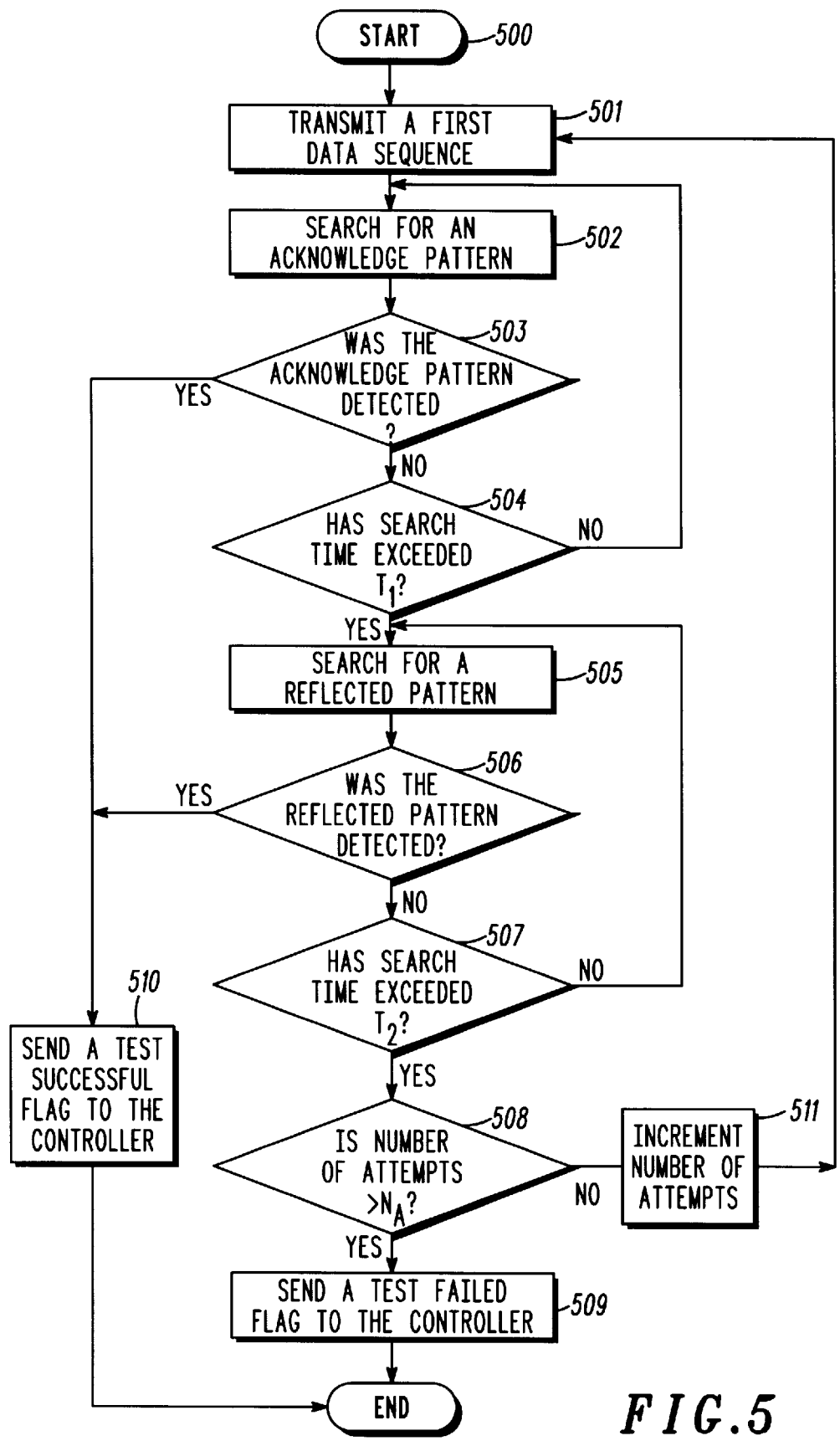
FIG. 5 is a flow diagram illustrating the steps for practicing a method according to the present invention.

FIG. 5 is a flow chart of a remote loop back test method in accordance with the present invention. The method as shown in FIG. 5 is capable of successfully initiating and completing a remote loop back test when the remote DDU 103 is configured for either the V.54 method or the Sprint method. When the local DDU 101 uses the method of the present invention it is not necessary for the local DDU to know the protocol of the remote DDU 103.

Referring to FIG. 5, the process starts when a command is issued from the local DTE 100 or from input pads on the local DDU 101, step 500. A first data sequence, such as at least two seconds of the PN127 sequence, is then transmitted by the local transmitter, step 501. Next a detector in the local receiver searches for a match between received data and a second data sequence, which may be the acknowledge sequence, step 502. When a match is found, then a test successful flag is sent to the controller, step 503 and step 510. If no match is found, the search will continue for a period of time equal to T1, step 504. When the search time has exceeded T1 the detector searches for a reflected sequence, step 505, where the reflected sequence is a delayed replica of the first data sequence. When a reflected sequence is detected the test successful flag is sent to the controller, step 506 and 510. The search then continues for a time equal to T2, step 507. When the search for the reflected sequence is unsuccessful for a time exceeding T2 then if the number of attempts (initially set at 1) is greater than NA, the number of attempts allowed, a test failed flag is sent to the controller. However if the number of attempts is not greater than NA then the number of attempts is incremented and the process, starting with step 501 is repeated. The method as shown in FIG. 5 is complete when either a test successful flag or a test failed flag is sent to the controller. In an embodiment T1=1.5 seconds, T2=2.0 seconds and NA=1. The method of FIG. 5 is capable of initiating and completing a remote loop back test when more than two) protocols are implemented in the remote DDU 102. However when there is more than two protocols, the local DDU 101 may require more search time and processing time to successfully complete the remote loop back test.

Figure 6:
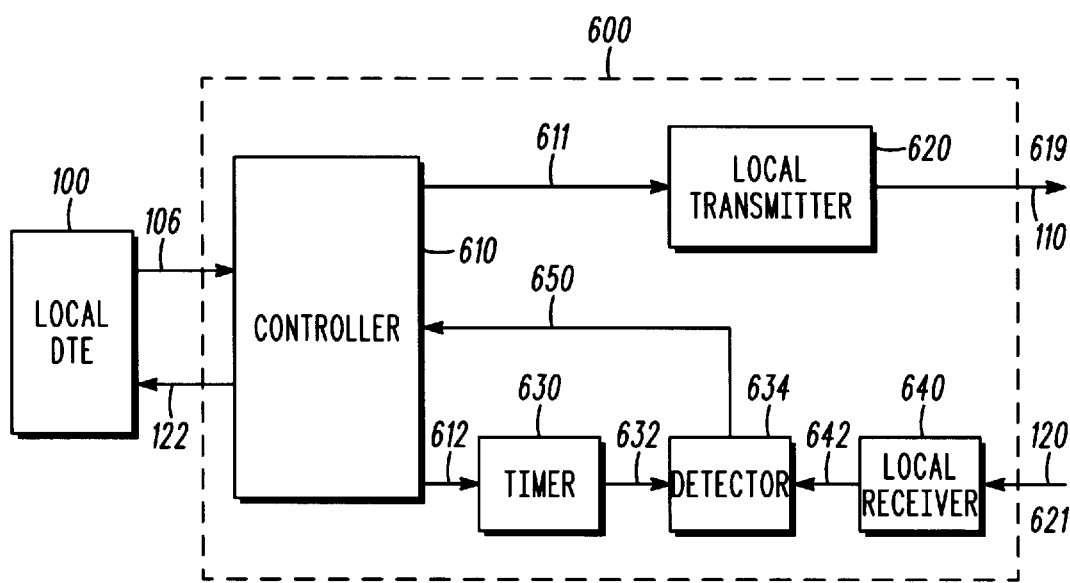
FIG. 6 is a block diagram illustrating functional components of an embodiment according to the present invention.

FIG. 6 is a block diagram illustrating the functional components of an embodiment in accordance with the present invention. An adaptive digital data unit 600 at a local site has a controller 610 for receiving and sending information and data to the local DTE 100. When the controller 610 receives a command from the DTE or from a front panel switch to initiate the digital loop back test, the controller commands a local transmitter 620 to transmit a first data sequence, which may be two seconds of the scrambled zero bit sequence. In addition a start signal is sent to a timer 630 over timer connection 612 and the timer is activated. The timer generates a control signal at predetermined times. The timer 630 is coupled to a detector 634, the detector has at least two predetermined sequences for detecting matches with receive data. A local receiver 640 receives a receive signal from the digital network via receive connector 120. The receiver is coupled to the detector and transfers receive data to the detector 634. The detector, in response to control signal, compares the receive data with a first predetermined sequence, which may be 1948 bits of scrambled binary ones sequence, for a first predetermined period of time, T1. If the detector 634, detects a match at any time during the predetermined time, T1, then the detector sends a test successful flag to the controller 610. The controller 610 may notify the local DTE 100 that the loop back test is successful. However if the detector does not find a match of the receive data with the first predetermined sequence during time T1, then for a second predetermined period of time, T2, the detector looks for a receive data match with a second predetermined sequence, which may be PN127 sequences. If a match is found during the time, T2, a test successful flag is sent to the controller. The process transmitting a first data sequence and then looking for a first predetermined sequence match and then looking for a second predetermined sequence match is repeated for an allowed number of times, NA. In an embodiment of the adaptive DDU 600 T1=1.5 seconds, T2=2 seconds, and NA=2.

An advantage of the method and apparatus of the present invention is the ability to successfully initiate and complete a remote loop back test when the design of the remote DDU 103 is unknown. Because the test can be implemented in a manner transparent to the user, it allows for a perform of the test without prior knowledge of the characteristics of the remote DDU, thereby saving both time and maintenance expense.

Another advantage of the present invention is the savings in setup time. When a local site user knows the protocol (V.54 or Sprint) of the remote DDU, local prior art device may need to be configured to be compatible with the remote device. Because the local site user does not have to obtain protocol information about the remote DDU and does not have to initialize the local DDU (should there be an incompatibility), the local site user is rewarded with a savings in setup time.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method of initiating and completing a remote loop back test in a digital data system having a local digital data unit connected to a remote digital data unit by way of a digital data network, the method comprising:

(a) transmitting from the local digital data unit a first data sequence;

(b) receiving at the local digital data unit a second data sequence from the remote digital data unit;

(c) determining if the second data sequence matches one of two predetermined data sequences; and (d) generating a test successful flag if a match occurs; wherein step (c) further includes:

(c1) determining for a first period of time if the second data sequence is an acknowledge sequence; and (c2) determining for a second period of time if the second data sequence is a reflected sequence.

2. The method of claim 1, further comprising:

(e) generating a test failed flag if a match does not occur.

3. The method of claim 1, wherein the acknowledge sequence is at least 1948 bits of scrambled binary ones generated by a scrambler polynomial equal to 1+X−4+X−7.

4. The method of claim 1, wherein the first data sequence is two seconds of scrambled binary zeros generated by a scrambler polynomial equal to 1+X−4+X−7.

5. The method of claim 3, wherein the reflected sequence is a scrambled binary zero sequence generated using a scrambler polynomial equal to1+X−4+X−7.

6. The method of claim 1, wherein the first period of time is approximately 1.5 seconds.

7. The method of claim 1, wherein the second period of time is approximately 2.0 seconds.

8. The method of claim 2, further comprising:

(f) repeating steps (a) through (e) for a predetermined number of times.

9. The method of claim 8, wherein the predetermined number of times is two.

* * * * *